US011543096B1

United States Patent
Lim et al.

(10) Patent No.: US 11,543,096 B1
(45) Date of Patent: Jan. 3, 2023

(54) PROJECTION LAMP MODULE AND HEADLAMP DEVICE FOR VEHICLE USING THE SAME

(71) Applicants: HYUNDAI MOTOR COMPANY, Seoul (KR); KIA CORPORATION, Seoul (KR)

(72) Inventors: Jung Wook Lim, Seoul (KR); Byoung Suk Ahn, Gwacheon-si (KR); Seung Sik Han, Hwaseong-si (KR); Ki Hong Lee, Seoul (KR); Sung Ho Park, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/869,133

(22) Filed: Jul. 20, 2022

(30) Foreign Application Priority Data

Sep. 15, 2021 (KR) .......................... 10-2021-0123510

(51) Int. Cl.
*F21S 41/25* (2018.01)
*F21S 41/675* (2018.01)
*F21S 41/33* (2018.01)
*F21S 41/29* (2018.01)
*G02B 26/08* (2006.01)

(52) U.S. Cl.
CPC ............. *F21S 41/675* (2018.01); *F21S 41/25* (2018.01); *F21S 41/295* (2018.01); *F21S 41/334* (2018.01); *G02B 26/0833* (2013.01)

(58) Field of Classification Search
CPC .. F21S 41/25; F21S 41/26; F21S 41/67; F21S 41/675
See application file for complete search history.

(56) References Cited

U.S. PATENT DOCUMENTS

2018/0095355 A1* 4/2018 Lim ...................... F21S 41/675
2020/0072701 A1 3/2020 Svrcek et al.
2020/0189448 A1 6/2020 Kunii et al.

FOREIGN PATENT DOCUMENTS

KR 10-1220063 B1 1/2013
KR 10-1795253 B1 11/2017

\* cited by examiner

*Primary Examiner* — Sean P Gramling
(74) *Attorney, Agent, or Firm* — McDonnell Boehnen Hulbert & Berghoff LLP

(57) ABSTRACT

The present disclosure provides a projection lamp module and a headlamp device for a vehicle using the same, in which two headlamps implement the same brightness, images of the headlamps are maintained, and visibility of an image projected onto a road surface is improved even though even though a lamp having a lighting function of forming an image on a road surface is applied to any one of the headlamps for a vehicle.

13 Claims, 5 Drawing Sheets

PROJECTION LAMP MODULE AND HEADLAMP DEVICE FOR VEHICLE USING THE SAME

CROSS REFERENCE TO RELATED APPLICATIONS

The present application claims priority to Korean Patent Application No. 10-2021-0123510, filed Sep. 15, 2021, the entire contents of which is incorporated herein for all purposes by this reference.

BACKGROUND

Field

The present disclosure relates to a projection lamp module and a headlamp device for a vehicle using the same, in which two headlamps implement the same brightness and images of the headlamps are maintained even though a lamp having a lighting function of forming an image on a road surface is applied to any one of the headlamps for a vehicle.

Description of the Related Art

In general, a headlamp illuminates a front route by emitting light in a direction in which a vehicle travels. The headlamp emits light to a location in front of the vehicle at night, thereby providing a driver with visual information. Therefore, when a front visual field is ensured at night, the driver can recognize other vehicles and obstacles on the road and thus safely drive the vehicle.

Recently, there has been developed a function of delivering messages to surrounding pedestrians or surrounding vehicles by forming particular images on a road surface using light emitted from headlamps. To this end, a projection lamp is applied to a vehicle, and light emitted from the projection lamp forms an image on a road surface.

However, in a case in which the projection lamps are applied to the two headlamps of the vehicle, it is difficult to match the images formed by the projection lamps.

Therefore, the single projection lamp is applied. However, because the projection lamp has different brightness from a lamp with a general lighting function, non-uniformity occurs because of the difference in brightness between the two headlamps when the vehicle is viewed from the outside. The non-uniformity degrades exterior design of the vehicle, which causes a limitation in applying the projection lamp.

In addition, the lamp image formed by the headlamps needs to be vertically symmetric when the vehicle travels at night in the state in which the single projection lamp is applied. However, the difference between the lamp images implemented by the projection lamp and the lamp with the general lighting function makes it difficult to recognize the vehicle by means of the lamp images, which does not meet the safety and regulations.

The above-mentioned matters described as the background art are provided merely to aid understanding of the background of the present disclosure, and should not be construed to admit that the matters correspond to the technologies already known to those skilled in the art.

SUMMARY

The present disclosure is proposed to solve these problems and aims to provide a projection lamp module and a headlamp device for a vehicle using the same, in which two headlamps implement the same brightness and images of the headlamps are kept vertically symmetric even though a lamp having a lighting function of forming an image on a road surface is applied to any one of the headlamps for a vehicle.

An embodiment of the present disclosure provides a projection lamp module and a headlamp device for a vehicle using the same, the projection lamp module including a light source configured to emit light, a variable mirror configured to reflect the light emitted from the light source and having divided reflective regions, the variable mirror being configured to allow the light moved and reflected by the respective reflective regions to have different lighting functions, and a lens configured such that the light reflected by the variable mirror is introduced into the lens, the lens is illuminated as the light having a particular lighting function is reflected in the lens when the light is introduced into the lens, and the light having a lighting function different from the particular lighting function is transmitted through the lens and projected onto a road surface.

The variable mirror may be divided into a first region and a second region, the lens may include a reflective portion and a light-emitting portion, the reflective portion may reflect the light, which is reflected by the first region of the variable mirror, to the light-emitting portion, and the light-emitting portion may be illuminated as the light reflected by the reflective portion is reflected in the light-emitting portion and transmit the light reflected by the second region of the variable mirror.

The variable mirror may be configured such that the light reflected by the first region has a Daytime Running Lights (DRL) or position function and the light reflected by the second region has a projection function of forming an image.

The variable mirror may be configured such that an area of the first region is smaller than an area of the second region, the reflective portion may be formed at an end of the lens, and the light-emitting portion may extend from and communicate with the reflective portion.

The reflective portion may include an incident surface formed at an angle at which the light is transmitted with respect to an incident direction of the light and configured to allow the light reflected by the first region of the variable mirror to enter the incident surface; and a reflective surface formed at an angle at which the light introduced through the incident surface is totally reflected toward the light-emitting portion.

The light-emitting portion may extend from the reflective portion and be configured such that the light reflected by the second region of the variable mirror is perpendicularly introduced into the light-emitting portion.

The projection lamp module may further include an image-forming lens part disposed between the variable mirror and the lens, and the light reflected by the first region of the variable mirror and having the lighting function and the light reflected by the second region of the variable mirror and having the lighting function may be respectively introduced into the reflective portion and the light-emitting portion of the lens through the image-forming lens part.

An end of the light-emitting portion, which is opposite to the reflective portion, may be configured to reflect the light.

Another embodiment of the present disclosure provides a headlamp device for a vehicle, the headlamp device including a first side headlamp configured to emit light having a particular lighting function, and a second side headlamp configured to selectively emit light having a lighting function identical to the particular lighting function of the first side headlamp and light having a lighting function different from the particular lighting function of the first side headlamp, in which the second side headlamp includes a first light source configured to emit the light, a variable mirror configured to reflect the light emitted from the first light source and having divided reflective regions, the variable mirror being configured to allow the light reflected by the respective regions to move with different lighting functions, and a first lens configured such that the light reflected by the variable mirror is introduced into the first lens, the first lens is illuminated as the light having the particular lighting function is reflected in the first lens when the light is introduced into the first lens, and the light having the lighting function different from the particular lighting function is transmitted through the first lens and projected onto a road surface.

The variable mirror may be divided into a first region and a second region, the first lens may include a first reflective portion and a first light-emitting portion, the first reflective portion may reflect the light, which is reflected by the first region of the variable mirror, to the first light-emitting portion, and the first light-emitting portion may be illuminated as the light reflected by the first reflective portion is reflected in the first light-emitting portion and transmit the light reflected by the second region of the variable mirror.

The first side headlamp may include a second light source configured to emit the light; and a second lens configured such that the light emitted from the second light source is introduced into the second lens, and the second lens is illuminated as the introduced light is reflected in the second lens.

The headlamp device may further include a condensing lens part disposed between the second light source and the second lens, and the light emitted from the second light source may be introduced into the second lens through the condensing lens part.

The second lens may include a second reflective portion and a second light-emitting portion, the second reflective portion may reflect the light, which is emitted from the second light source, to the second light-emitting portion, and the second light-emitting portion may be illuminated as the light reflected by the second reflective portion is reflected in the second light-emitting portion.

According to the projection lamp module and the headlamp device for a vehicle using the same structured as described above, the two headlamps implement the same brightness, the images of the headlamps are maintained, and the visibility of the image projected onto the road surface is also improved even though the lamp having the lighting function of forming the image on the road surface is applied to any one of the headlamps of the vehicle.

DETAILED DESCRIPTION

Hereinafter, a projection lamp module and a headlamp device for a vehicle using the same according to an exemplary embodiment of the present disclosure will be described with reference to the accompanying drawings.

Figure 1:
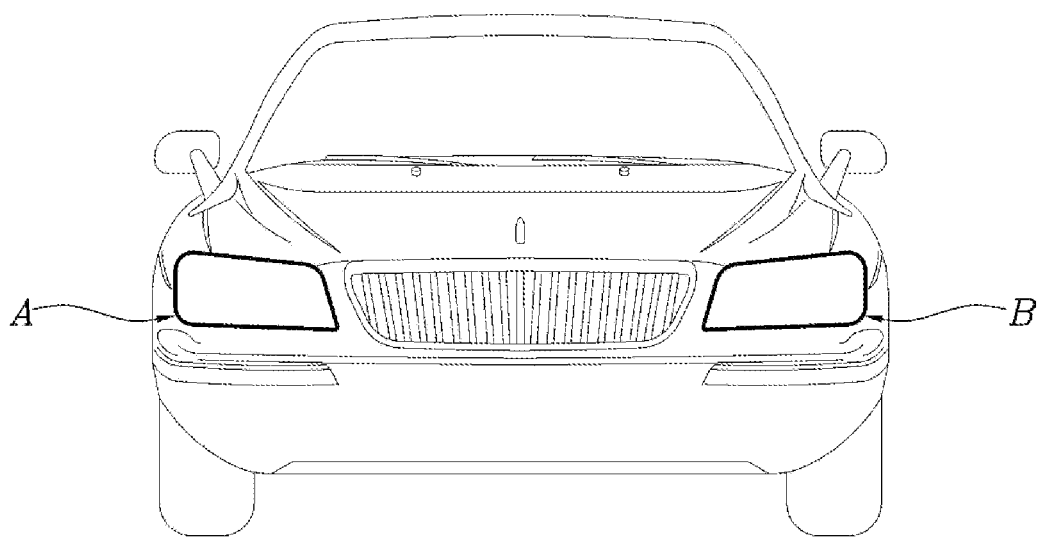
FIG. 1 is a view illustrating a headlamp for a vehicle.
Figure 2:
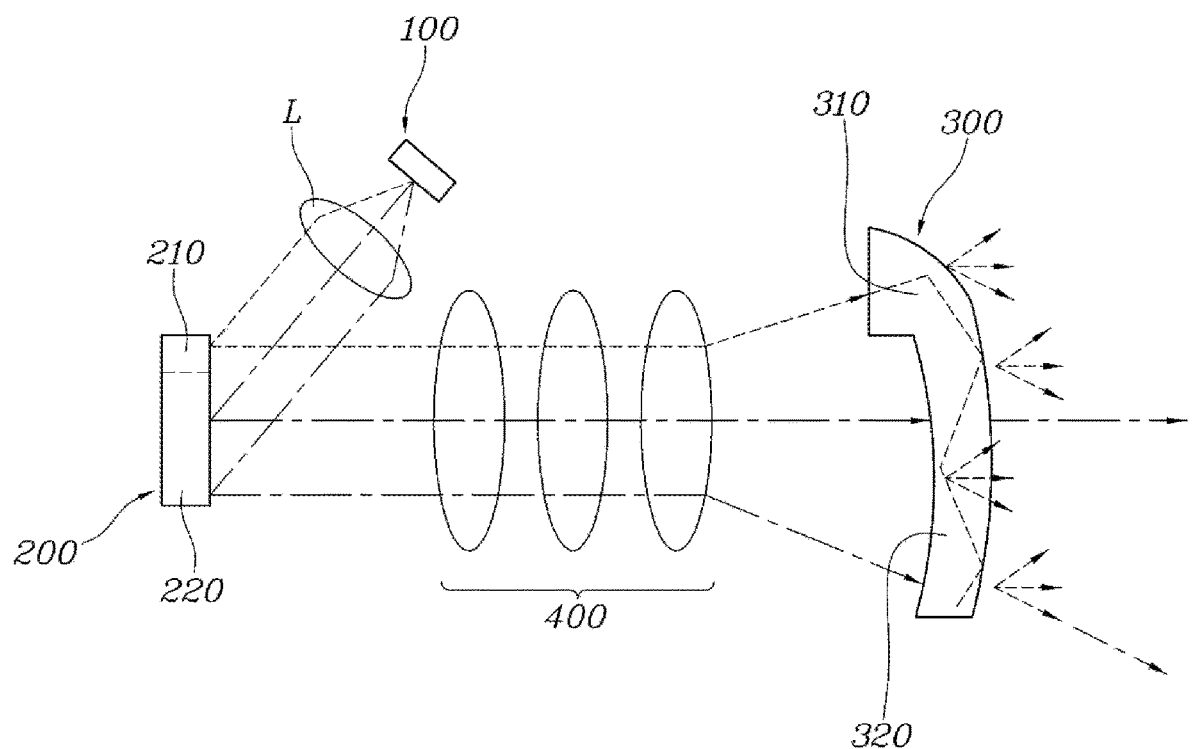
FIG. 2 is a view illustrating a projection lamp module according to the present disclosure.
Figure 3:
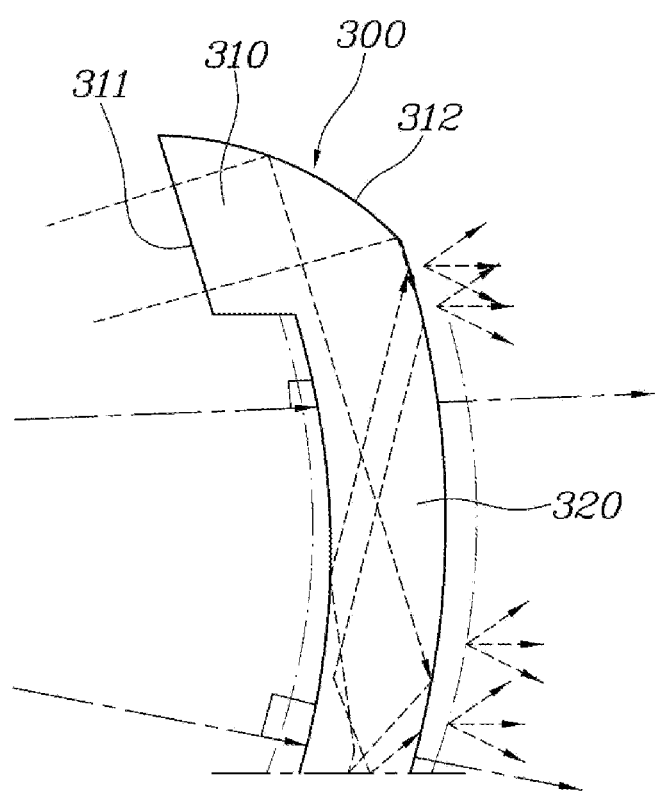
FIG. 3 is a view illustrating a lens of the projection lamp module illustrated in FIG. 1.
Figure 4:
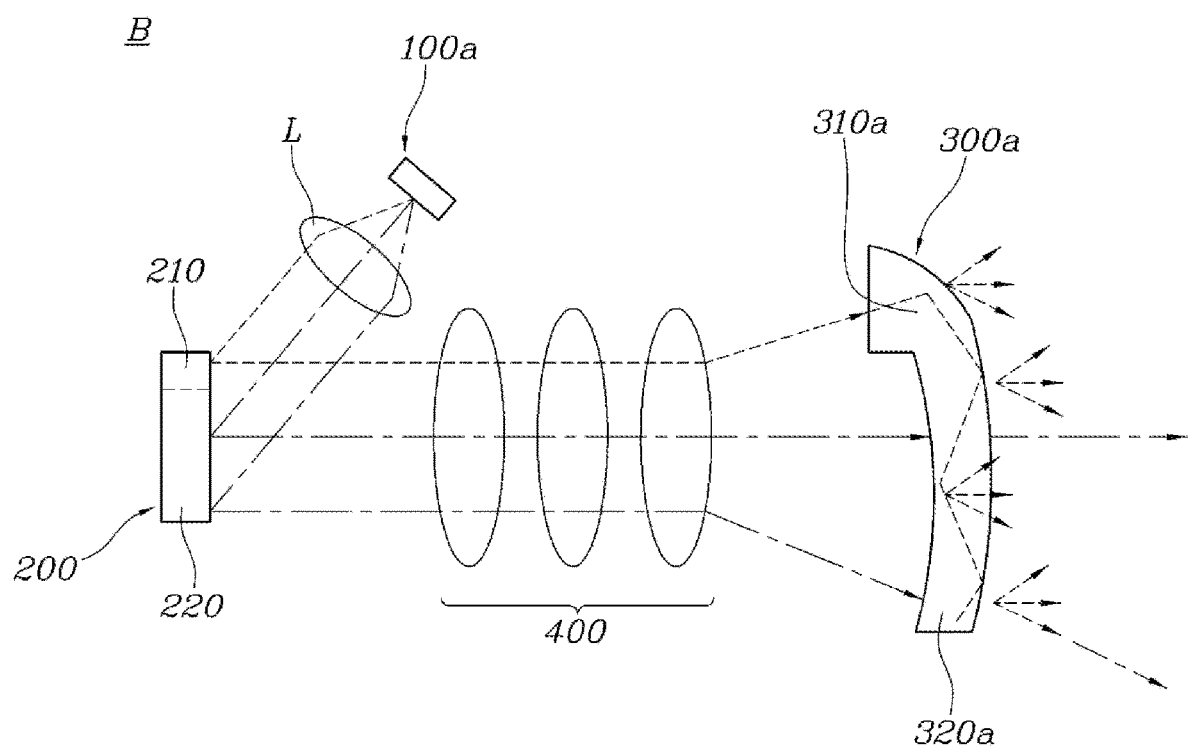
FIG. 4 is a view illustrating a second side headlamp of a headlamp device for a vehicle.
Figure 5:
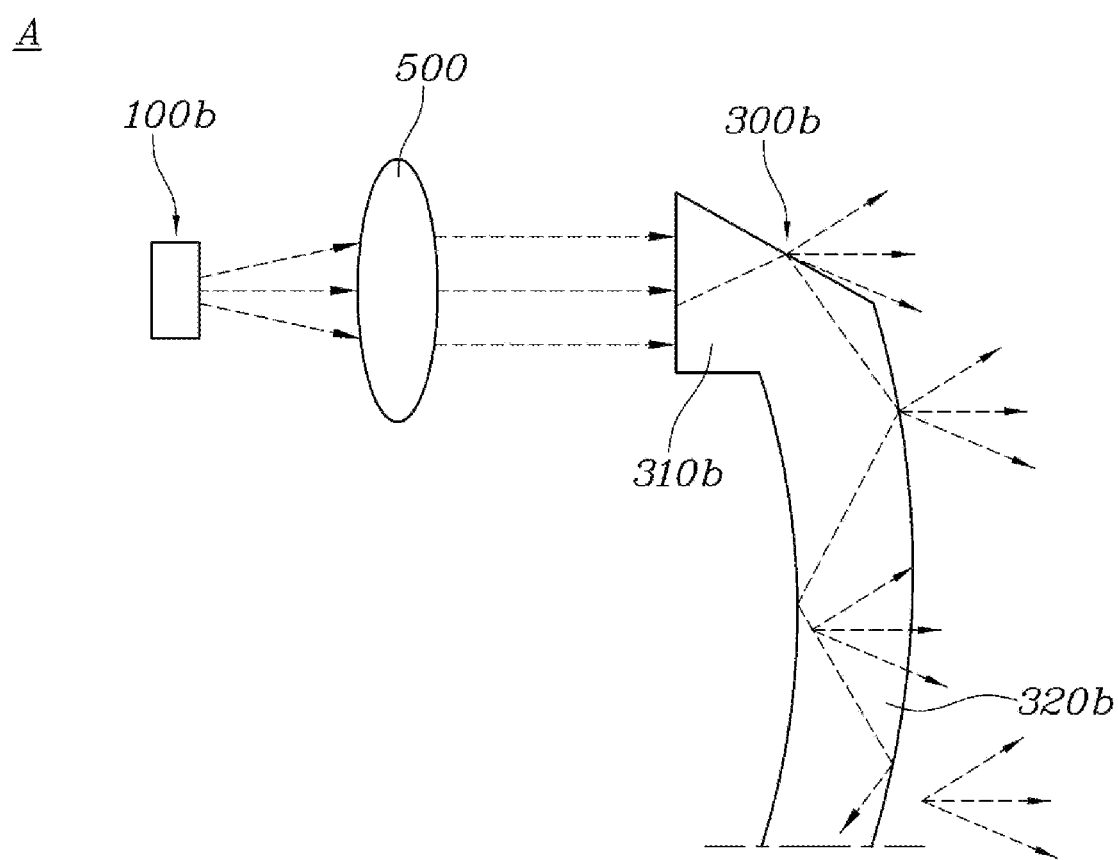
FIG. 5 is a view illustrating a first side headlamp of the headlamp device for a vehicle.

FIG. 1 is a view illustrating a headlamp for a vehicle, FIG. 2 is a view illustrating a projection lamp module according to the present disclosure, FIG. 3 is a view illustrating a lens of the projection lamp module illustrated in FIG. 1, FIG. 4 is a view illustrating a second side headlamp of a headlamp device for a vehicle, and FIG. 5 is a view illustrating a first side headlamp of the headlamp device for a vehicle.

As illustrated in FIGS. 1 to 3, a projection lamp module according to the present disclosure includes a light source 100 configured to emit light, a variable mirror 200 configured to reflect the light emitted from the light source 100 and having divided reflective regions, the variable mirror 200 being configured to reflect the light in different directions through the respective reflective regions, and a lens 300 configured such that the light reflected by the variable mirror 200 is introduced into the lens 300. The lens 300 is illuminated as the light having a particular lighting function is reflected in the lens 300 when the light is introduced into the lens 300, and the light having a lighting function different from the particular lighting function is transmitted through the lens 300 and projected onto a road surface.

The light source 100 may be an LED and installed to emit the light to the variable mirror 200. In addition, a condensing lens L may be provided to allow the light emitted from the light source 100 to enter the variable mirror 200.

The variable mirror 200 may include a plurality of fine reflective mirrors configured to change movement directions of the introduced light while changing angles thereof by being turned on or off when a driving signal is inputted. The variable mirror 200 may be configured as a digital micromirror device (DMD), and the angles of the fine reflective mirrors may be adjusted as the fine reflective mirrors are controlled to be turned on or off, such that the movement directions of the introduced light may be changed.

The lens 300 is provided to allow the light reflected by the variable mirror 200 to enter the lens 300. The lens 300 is illuminated by the light having the respective lighting functions and reflected by the variable mirror 200 or transmits the light to implement the plurality of lighting functions. That is, depending on the shape of the lens 300, the lens 300 is illuminated as the light reflected by the variable mirror 200 and having the particular lighting function is reflected in the lens 300. The light reflected by the variable mirror 200 and having the lighting function different from the particular lighting function is transmitted through the lens 300 and projected onto the road surface, thereby implementing the plurality of lighting functions.

The present disclosure will be specifically described. The variable mirror 200 is divided into a first region 210 and a second region 220. The lens 300 includes a reflective portion 310 and a light-emitting portion 320. The reflective portion 310 serves to reflect the light, which is reflected by the first region 210 of the variable mirror 200, to the light-emitting portion 320. The light-emitting portion 320 is illuminated as the light reflected by the reflective portion 310 is reflected in the light-emitting portion 320 and transmits the light reflected by the second region 220 of the variable mirror 200.

Since the variable mirror 200 is divided into the first region 210 and the second region 220 as described above, the lighting functions are divided into a lighting function implemented when the light emitted from the light source 100 is reflected by the first region 210 and a lighting function implemented when the light is reflected by the second region 220.

Therefore, the lens 300 includes the reflective portion 310 into which the light reflected by the first region 210 of the variable mirror 200 is introduced, and the light-emitting portion 320 into which the light reflected by the second region 220 of the variable mirror 200 is introduced. The reflective portion 310 reflects the introduced light toward the light-emitting portion 320, and the light-emitting portion 320 is illuminated by allowing the light reflected by the reflective portion 310 to be reflected in the light-emitting portion 320. In particular, the light-emitting portion 320 transmits the light, which is reflected by the second region 220 of the variable mirror 200, when the light is introduced, such that the light is projected onto the road surface.

Therefore, the light reflected by the first region 210 of the variable mirror 200 and introduced into the lens 300 moves from the reflective portion 310 to the light-emitting portion 320, such that the lighting function is implemented as the light-emitting portion 320 is illuminated. The light reflected by the second region 220 of the variable mirror 200 and introduced into the light-emitting portion 320 is transmitted through the light-emitting portion 320, such that a lighting function different from the aforementioned lighting function is implemented.

In this case, the variable mirror 200 serves to allow the light reflected by the first region 210 to have a Daytime Running Lights (DRL) or position function and allow the light reflected by the second region 220 to have a projection function of forming an image.

That is, the light emitted from the light source 100 is reflected by the first region 210 of the variable mirror 200, reflected again by the reflective portion 310 of the lens 300, and moved to the light-emitting portion 320, such that the light-emitting portion 320 is entirely illuminated. Therefore, the lens 300 implements the DRL or position function by means of the light reflected by the first region 210. In addition, the light emitted from the light source 100 is reflected by the second region 220 of the variable mirror 200, moved to the light-emitting portion 320 of the lens 300, and transmitted as it is through the light-emitting portion 320 of the lens 300, such that the projection function of forming the image on the road surface is implemented.

Meanwhile, the variable mirror 200 is configured such that an area of the first region 210 is smaller than an area of the second region 220. That is, the DRL or position function requires a relatively smaller amount of light than the position function. Therefore, the variable mirror 200 is configured such that the first region 210 has a smaller area than the second region 220. The areas of the first and second regions 210 and 220 of the variable mirror 200 may be set depending on the amount of light. Therefore, the visibility of the position function and the DRL or position function is improved.

In addition, the reflective portion 310 is provided at an end of the lens 300, and the light-emitting portion 320 extends from and communicates with the reflective portion 310. Therefore, the lens 300 allows the light reflected by the variable mirror 200 to move from one side to the other side, such that the visibility of the DRL or position function made by the light-emitting portion 320 is improved. Further, since the reflective portion 310 is positioned at one side of the light-emitting portion 320 of the lens 300, the position function made by the light-emitting portion 320 may be implemented without interfering with the reflective portion 310.

Meanwhile, as illustrated in FIG. 3, the reflective portion 310 includes an incident surface 311 formed at an angle at which the light is transmitted with respect to an incident direction of the light and configured to allow the light reflected from the first region 210 of the variable mirror 200 to enter the incident surface 311, and a reflective surface 312 formed at an angle at which the light introduced through the incident surface 311 is totally reflected toward the light-emitting portion 320.

That is, the incident surface 311 of the reflective portion 310 is formed to be approximately perpendicular to the incident direction of the light reflected by the first region 210 of the variable mirror 200, such that the light reflected by the first region 210 of the variable mirror 200 is transmitted through the incident surface 311 and introduced into the inside of the lens 300. In addition, the reflective surface 312 of the reflective portion 310 is formed at an angle at which the light is totally reflected with respect to the incident direction of the light transmitted through the incident surface 311, such that the reflected light is moved toward the light-emitting portion 320. Therefore, the light reflected by the first region 210 of the variable mirror 200 passes through the incident surface 311 of the lens 300 and enters the reflective surface 312, and the light totally reflected by the reflective surface 312 is moved toward the light-emitting portion 320, reflected again in the light-emitting portion 320, and exits the light-emitting portion 320, such that the light-emitting portion 320 may be illuminated. Therefore, the lens 300 may implement the DRL or position function.

Meanwhile, the light-emitting portion 320 extends from the reflective portion 310 and is configured such that the light reflected by the second region 220 of the variable mirror 200 perpendicularly enters the light-emitting portion 320. The light-emitting portion 320 is perpendicular to the incident direction of the light reflected by the second region 220 of the variable mirror 200, such that the light reflected by the second region 220 of the variable mirror 200 is transmitted as it is through the light-emitting portion 320.

In addition, an image-forming lens part 400 may be further provided between the variable mirror 200 and the lens 300. The image-forming lens part 400 may include a plurality of image-forming lens parts, and the light transmitted through the plurality of image-forming lens parts 400 is projected with an angular arrangement because of characteristics of an image-forming optical system. Therefore, the lens 300 has a curved surface formed toward the image-forming lens part 400, and the light transmitted through the image-forming lens part 400 is perpendicularly introduced into the lens 300, such that the image formed by the projection function is not distorted, and the visibility is improved.

Meanwhile, the reflective portion 310 is formed at one side end of the light-emitting portion 320, and the light moved by the variable mirror 200 and the reflective portion 310 is reflected by the other side end of the light-emitting portion 320. In this case, a reflective coating may be applied to the other side end of the light-emitting portion 320 to smoothly reflect the introduced light. Therefore, the light-emitting portion 320 is illuminated by the light introduced through the reflective portion 310, and the light is reflected again by the other side end of the light-emitting portion 320, such that the amount of light may be ensured in the light-emitting portion 320, and the light-emitting portion 320 may be entirely illuminated.

Meanwhile, as illustrated in FIG. 1, the headlamp device for a vehicle according to the present disclosure includes a first side headlamp A configured to emit the light having the particular lighting function, and a second other side headlamp B configured to selectively emit the light having a lighting function identical to the particular lighting function of the first side headlamp A and the light having the lighting function different from the particular lighting function of the first side headlamp A.

That is, the vehicle has the first side headlamp A and the second side headlamp B. The first side headlamp A emits the light having the particular lighting function. The second side headlamp B emits the light having the lighting function identical to the particular lighting function of the first side headlamp A and the light having the lighting function different from the particular lighting function of the first side headlamp A. Therefore, one side headlamp A may implement the DRL or position function, and the second side headlamp B may implement the DRL or position function and the projection function.

In this case, as illustrated in FIG. 4, the second side headlamp B includes a first light source 100a configured to emit light, the variable mirror 200 configured to reflect the light emitted from the first light source 100a and having the divided reflective regions, the variable mirror 200 being configured to allow the light to move to implement different lighting functions when the light is reflected by the regions, and a first lens 300a configured such that the light reflected by the variable mirror 200 is introduced into the first lens 300a. The first lens 300a is illuminated as the light having a particular lighting function is reflected in the first lens 300a when the light is introduced into the first lens 300a, and the light having a lighting function different from the particular lighting function is transmitted through the first lens 300a and projected onto the road surface.

The first light source 100a may be an LED and installed to emit the light to the variable mirror 200.

The variable mirror 200 may include a plurality of fine reflective mirrors configured to change movement directions of the introduced light while changing angles thereof by being turned on or off when a driving signal is inputted.

Depending on the shape of the first lens 300a, the first lens 300a is illuminated as the light reflected by the variable mirror 200 and having the particular lighting function is reflected in the first lens 300a, and the light reflected by the variable mirror 200 and having the lighting function different from the particular lighting function is transmitted as it is through the first lens 300a and projected onto the road surface, thereby implementing the plurality of lighting functions.

Meanwhile, as can be seen in FIG. 4, the variable mirror 200 is divided into the first region 210 and the second region 220. The first lens 300a includes a first reflective portion 310a and a first light-emitting portion 320a. The first reflective portion 310a serves to reflect the light, which is reflected by the first region 210 of the variable mirror 200, to the first light-emitting portion 320a. The first light-emitting portion 320a is illuminated by the light reflected by the first reflective portion 310a and transmits the light reflected by the second region 220 of the variable mirror 200.

Since the variable mirror 200 is divided into the first region 210 and the second region 220 as described above, the lighting functions are divided into a lighting function implemented when the light emitted from the light source 100 is reflected by the first region 210 and a lighting function implemented when the light is reflected by the second region 220.

Therefore, the first lens 300a includes the first reflective portion 310a into which the light reflected by the first region 210 of the variable mirror 200 is introduced, and the first light-emitting portion 320a into which the light reflected by the second region 220 of the variable mirror 200 is introduced. The first reflective portion 310a reflects the introduced light toward the first light-emitting portion 320a, and the first light-emitting portion 320a is illuminated by allowing the light reflected by the first reflective portion 310a to be reflected in the first light-emitting portion 320a. In particular, the first light-emitting portion 320a transmits the light, which is reflected by the second region 220 of the variable mirror 200, when the light is introduced, such that the light is projected onto the road surface.

Meanwhile, as illustrated in FIG. 5, the first side headlamp A includes a second light source 100b configured to emit light, and a second lens 300b configured such that the light emitted from the second light source 100b is introduced into the second lens 300b, and the second lens 300b is illuminated as the introduced light is reflected in the second lens 300b.

The second light source 100b may be an LED and installed to emit the light to the second lens 300b. In addition, an optical lens may be provided in the second light source 100b to allow the emitted light to enter the second lens 300b.

The second lens 300b is illuminated as the light is reflected in the second lens 300b when the light emitted from the second light source 100b is introduced, such that the lighting function is implemented. Therefore, the second lens 300b implements the DRL or position function when the second lens 300b is illuminated by the light emitted from the second light source 100b.

Meanwhile, the second lens 300b includes a second reflective portion 310b and a second light-emitting portion 320b. The second reflective portion 310b reflects the light, which is emitted from the second light source 100b, to the second light-emitting portion 320b. The second light-emitting portion 320b is illuminated as the light reflected by the second reflective portion 310b is reflected in the second light-emitting portion 320b.

That is, the second lens 300b includes the second reflective portion 310b into which the light emitted from the second light source 100b is introduced, and the second light-emitting portion 320b which is illuminated by the light reflected by the second reflective portion 310b and introduced into the second light-emitting portion 320b. In this case, an incident surface of the second reflective portion 310b is formed to be approximately perpendicular to an incident direction of the light emitted from the second light source 100b, such that the light emitted from the second light source 100b is transmitted through the incident surface of the second reflective portion 310b and introduced into the second reflective portion 310b. In addition, a reflective surface of the second reflective portion 310b is formed at an angle at which the light transmitted through the incident surface 311 is totally reflected with respect to the incident direction, such that the reflected light is moved toward the second light-emitting portion 320b. Therefore, the light emitted from the second light source 100b passes through the incident surface of the second lens 300b and enters the reflective surface, and the light totally reflected by the reflective surface 312 is moved toward the second light-emitting portion 320b, reflected in the second light-emitting portion 320b, and exits the second light-emitting portion 320b, such that the second light-emitting portion 320b may be illuminated. Therefore, the second lens 300b may implement the DRL or position function identical to that of the first lens 300a.

In this case, a condensing lens part 500 is further provided between the second light source 100b and the second lens 300b, such that the light emitted from the second light source 100b enters the second reflective portion 310b through the condensing lens part 500. Therefore, since the light emitted from the second light source 100b is collected by the condensing lens part 500 and moved to the incident surface of the second reflective portion 310b, a loss of light is reduced. Since the light is concentrated on the second reflective portion 310b, the amount of light is ensured when the second light-emitting portion 320b is illuminated.

According to the present disclosure as described above, only the other side headlamp B, between one side headlamp A and the other side headlamp B, performs the projection function. Therefore, the image formed by the projection function is clear, and one side headlamp A and the other side headlamp B implement the same brightness, such that the images of the headlamps are maintained.

While the specific embodiments of the present disclosure have been illustrated and described, it will be obvious to those skilled in the art that the present disclosure may be variously modified and changed without departing from the technical spirit of the present disclosure defined in the appended claims.

The invention claimed is:

1. A projection lamp module comprising:
 a light source configured to emit light;
 a variable mirror configured to reflect the light emitted from the light source and having divided reflective regions, the variable mirror being configured to reflect the light in different directions through the reflective regions; and
 a lens configured such that the light reflected by the variable mirror is introduced into the lens, the lens being illuminated as the light having a particular lighting function is reflected in the lens when the light is introduced into the lens, and wherein the light having a lighting function different from the particular lighting function is transmitted through the lens and projected onto a road surface.

2. The projection lamp module of claim 1, wherein the variable mirror is divided into a first region and a second region, the lens comprising a reflective portion and a light-emitting portion, the reflective portion reflecting the light, which is reflected by the first region of the variable mirror, to the light-emitting portion, and the light-emitting portion being illuminated as the light reflected by the reflective portion is reflected in the light-emitting portion, and transmits the light reflected by the second region of the variable mirror.

3. The projection lamp module of claim 2, wherein the variable mirror is configured such that the light reflected by the first region has a Daytime Running Lights (DRL) or position function and the light reflected by the second region has a projection function of forming an image.

4. The projection lamp module of claim 2, wherein the variable mirror is configured such that an area of the first region is smaller than an area of the second region, the reflective portion is formed at an end of the lens, and the light-emitting portion extends from and communicates with the reflective portion.

5. The projection lamp module of claim 2, wherein the reflective portion comprises:
 an incident surface formed at an angle at which the light is transmitted with respect to an incident direction of the light, and configured to allow the light reflected by the first region of the variable mirror to enter the incident surface; and
 a reflective surface formed at an angle at which the light introduced through the incident surface is totally reflected toward the light-emitting portion.

6. The projection lamp module of claim 2, wherein the light-emitting portion extends from the reflective portion, and is configured such that the light reflected by the second region of the variable mirror is perpendicularly introduced into the light-emitting portion.

7. The projection lamp module of claim 2, further comprising:
 an image-forming lens part disposed between the variable mirror and the lens,
 wherein the light reflected by the first region of the variable mirror and having the lighting function is introduced into the reflective portion of the lens through the image-forming lens part, and the light reflected by the second region of the variable mirror and having the lighting function is introduced into the light-emitting portion of the lens through the image-forming lens part.

8. The projection lamp module of claim 2, wherein the reflective portion is formed at a first side end of the light-emitting portion, and a second side end of the light-emitting portion reflects the light moved by the variable mirror and the reflective portion.

9. A headlamp device for a vehicle, the headlamp device comprising:
 a first side headlamp configured to emit light having a particular lighting function; and
 a second side headlamp configured to selectively emit light having a lighting function identical to the particular lighting function of the first side headlamp, and light having a lighting function different from the particular lighting function of the first side headlamp,
 wherein the second side headlamp comprises:
 a first light source configured to emit the light;
 a variable mirror configured to reflect the light emitted from the first light source and having divided reflective regions, the variable mirror being configured to allow the light reflected by the respective regions to move with different lighting functions; and
 a first lens configured such that the light reflected by the variable mirror is introduced into the first lens, the first lens being illuminated as the light having the particular lighting function is reflected in the first lens when the light is introduced into the first lens, and the light having the lighting function different from the particular lighting function being transmitted through the first lens and projected onto a road surface.

10. The headlamp device of claim 9, wherein the variable mirror is divided into a first region and a second region, the first lens comprising a first reflective portion and a first light-emitting portion, the first reflective portion reflecting the light, which is reflected by the first region of the variable mirror, to the first light-emitting portion, and the first light-emitting portion being illuminated as the light reflected by the first reflective portion is reflected in the first light-emitting portion and transmits the light reflected by the second region of the variable mirror.

11. The headlamp device of claim 9, wherein the first side headlamp comprises:
 a second light source configured to emit the light; and
 a second lens configured such that the light emitted from the second light source is introduced into the second lens, and the second lens is illuminated as the introduced light is reflected in the second lens.

12. The headlamp device of claim 11, wherein the second lens comprises a second reflective portion and a second light-emitting portion, the second reflective portion reflects the light, which is emitted from the second light source, to the second light-emitting portion, and the second light-emitting portion is illuminated as the light reflected by the second reflective portion is reflected in the second light-emitting portion.

13. The headlamp device of claim 12, further comprising:
a condensing lens part disposed between the second light source and the second lens,
wherein the light emitted from the second light source is introduced into the second reflective portion through the condensing lens part.

\* \* \* \* \*